United States Patent
Hollender et al.

(10) Patent No.: US 9,235,209 B2
(45) Date of Patent: Jan. 12, 2016

(54) DISPLAY SYSTEM FOR GRAPHIC REPRESENTATION OF ALARM REPORTS OF A TECHNICAL PLANT OR TECHNICAL PROCESS

(75) Inventors: Martin Hollender, Heidelberg (DE); Carsten Beuthel, Laudenbach (DE)

(73) Assignee: ABB TECHNOLOGY AG, Zurich (CH)

(*) Notice: Subject to any disclaimer, the term of this patent is extended or adjusted under 35 U.S.C. 154(b) by 1917 days.

(21) Appl. No.: 11/844,687

(22) Filed: Aug. 24, 2007

(65) Prior Publication Data

US 2008/0072171 A1 Mar. 20, 2008

(30) Foreign Application Priority Data

Sep. 16, 2006 (DE) .......................... 10 2006 043 579

(51) Int. Cl.
G06F 3/048 (2013.01)
G05B 23/02 (2006.01)

(52) U.S. Cl.
CPC ................................. G05B 23/0272 (2013.01)

(58) Field of Classification Search
USPC ........................................................ 715/772
See application file for complete search history.

(56) References Cited

U.S. PATENT DOCUMENTS

| | | | | |
|---|---|---|---|---|
| 5,963,884 | A * | 10/1999 | Billington et al. | 702/56 |
| 7,729,887 | B2 * | 6/2010 | Sherrill et al. | 702/188 |
| 2002/0019672 | A1 * | 2/2002 | Paunonen | 700/17 |
| 2002/0077711 | A1 * | 6/2002 | Nixon et al. | 700/51 |
| 2003/0028269 | A1 * | 2/2003 | Spriggs et al. | 700/83 |
| 2005/0007249 | A1 * | 1/2005 | Eryurek et al. | 340/511 |
| 2005/0216826 | A1 * | 9/2005 | Black et al. | 715/502 |
| 2008/0066004 | A1 * | 3/2008 | Blevins et al. | 715/771 |
| 2008/0168356 | A1 * | 7/2008 | Eryurek et al. | 715/736 |

FOREIGN PATENT DOCUMENTS

| EP | 0 389 132 A2 | 9/1990 |
|---|---|---|
| EP | 0 482 523 A2 | 4/1992 |

OTHER PUBLICATIONS

European Search Report dated Nov. 27, 2009 issued in European Application No. 07014774.9-2206.

* cited by examiner

*Primary Examiner* — Anil N Kumar
(74) *Attorney, Agent, or Firm* — Buchanan Ingersoll & Rooney PC

(57) ABSTRACT

A display system includes a processing device for graphic representation of alarm reports from measured values of a technical plant or process. Measurement points of the measured values each respectively have a hierarchically structured identifier held in the processing device. The processing device decomposes the hierarchically structured identifiers into hierarchical levels of different significance, selects the identifiers of the hierarchical levels with the highest significance, and transmits them to a preconfigured mass alarm display unit. The identifiers of the hierarchical levels with the highest significance can be assigned to a correspondingly identified area within an overview image of the plant or process of the preconfigured mass alarm display unit. The alarm reports which are generated from the measured values can be represented graphically, taking into account the generated assignment of the identifier of the measurement points to the correspondingly identified area within the overview image of the plant or process.

29 Claims, 3 Drawing Sheets

DISPLAY SYSTEM FOR GRAPHIC REPRESENTATION OF ALARM REPORTS OF A TECHNICAL PLANT OR TECHNICAL PROCESS

RELATED APPLICATIONS

This application claims priority under 35 U.S.C. §119 to German Application 102006043579.6 filed in Germany on Sep. 16, 2006, the entire contents of which are hereby incorporated by reference in their entireties.

TECHNICAL FIELD

A display system and a method are disclosed for graphic representation of alarm reports from measured values of a technical plant or technical process, e.g., in power stations or oil refineries, and can be suitable for graphic representation of process alarms.

BACKGROUND INFORMATION

In technical plants, e.g. in power generation plants or plants of the chemical industry, multiple alarm reports, also called mass alarms, are generated. The alarm reports, which, for instance, indicate critical process states, are usually represented by multiple display elements, which are mostly assigned directly to the corresponding measured values.

The process measured values are mostly identified systematically by task, type and location, e.g. by the conventional power station identification system "KKS", which is used worldwide in power stations.

Although many technical plants of the chemical industry or power generation have a similar basic structure in relation to their function, they differ in detail considerably, so that the identifiers and components (which are based on a plant identification system) for the measurement points of the process measured values are different for each plant.

Alarm displays which are currently used thus require, for their representation, a project-specific configuration, since each specific process measured value must be linked to a corresponding display element via its identifier.

Changes within the technical plant or technical process are usually isolated with dedicated (assigned) display elements, or represented textually as an alarm line. This procedure is useful only if a small number of information items, i.e. only a few alarm reports, are displayed. However, as soon as a large number of parallel information items are to be displayed, this type of display is not advantageous, since because of the large number of detailed information items, the plant driver cannot gain an overview of the whole situation of the plant.

To represent a mass alarm display graphically, for instance a large number of display elements are arranged so that the plant driver can use their overall image for pattern recognition. However, each individual display element must be separately configured, standardized and arranged in the mass alarm display correspondingly to the plant topology, so that the mass alarm display, when faults occur in the plant, generates specific representations. This representation form of the mass alarm display is associated with considerable planning cost, since every measured value must be wired individually.

US 2005216826 describes a method by which the complex interrelationships in the representation of mass alarms can be made visible without great configuration cost. The described method is used for analysis of process interrelationships. However, process states cannot be represented.

Further disadvantages of the currently used graphic alarm displays, in addition to the high configuration cost described above, are isolated observation and representation of the individual alarm reports. No preconfigured displays which are capable of functioning for multiple plants without prior adaptation exist.

SUMMARY

The disclosure is accordingly based on the object of giving a display system and a method for graphic representation of alarm reports from measured values of a technical plant or technical process, particularly for representing process alarms, so that the above-mentioned disadvantages of the prior art are overcome.

According to the disclosure, the display system for graphic representation of alarm reports from measured values of a technical plant or technical process includes a processing device in which hierarchically structured identifiers of measurement points of the measured values are held.

The processing device decomposes the hierarchically structured identifiers of the measurement points into hierarchical levels of different significance, selects the identifier of the hierarchical level of the measurement point with the currently highest significance, and transmits the selected identifiers of the appropriate measurement point to a preconfigured mass alarm display unit, it being possible for the selected identifiers to be assigned to a correspondingly identified area within an overview image of the plant or process of the preconfigured mass alarm display unit, and for the alarm reports which are generated from the measured values to be represented graphically, taking account of the generated assignment of the selected identifiers of the relevant measurement point to the correspondingly identified area within the overview image of the plant or process.

The mass alarm display unit of the display system according to the disclosure can be provided to display multiple process alarms, also called mass alarms, and to generate an overall image, if multiple alarms are linked to each other via the process dynamics.

In an exemplary embodiment of the display system according to the disclosure, the mass alarm display unit is preconfigured so that a plant image which is represented by means of the mass alarm display unit is divided into areas, which can overlap with each other. A primary key, e.g. a KKS primary group, is assigned to each of these areas, and the visual effects with which the areas of the plant image are to make the process states which occur visible are defined. For dynamic visualization of the overall image, a very wide variety of effects of modern computer graphics are suitable, e.g. colouring a black and white image, representing areas by fuzziness, brightening or darkening the corresponding areas, or morphing (computer-generated special effect, in which, for instance, intermediate transitions between two individual images are computed and represented as a seamless transition) bitmaps.

Because only KKS primary groups are used, it is possible, without additional cost, to group alarm reports, so that the alarm reports only appear as a group and are no longer displayed as individual values.

It is also provided that the alarm reports which occur are differently weighted, so that, for instance, two alarms of medium priority have the same optical effect in their representation as one alarm with high priority.

In a further exemplary embodiment of the disclosure, it is provided that those areas in a plant image in which many temperature alarms occur are held graphically in such a way that these areas can be represented via so-called "melting".

The appropriate visual effect is transmitted, according to a mapping rule to be defined, into the corresponding areas of the graphic plant image. Examples of such mapping rules are:
- the number of alarms per time interval in the corresponding primary group,
- the number of manual interventions per time interval, or
- the priority of the currently occurring alarm with the highest priority.

Further advantages of the disclosure are based on the fact that the assignment of the identifiers of the measurement points to the areas of the overview image applies to a large number of similar plants, since many plants have the same or similar structure at a high level of abstraction. It is thus possible to supply preconfigured displays, which function immediately for a large number of plants with no adaptation.

For the operator of the technical plant, because of the visually responding computer graphic effects in specified areas in the overview image, it becomes possible to grasp complex process states intuitively, because the holistic (integrated) representation of the alarm reports of the plant or process in the plant overview image is better adapted to human perception than the conventional isolated observation of individual alarm reports.

A further advantage of the system according to the disclosure is based on the fact that the project-specific configuration cost during the planning phase of the plant is greatly reduced or non-existent.

A hierarchically structured identifier can be assigned to each of the measurement points of the measured values of the technical plant or technical process, and the hierarchically structured identifiers of the measurement points are held in a processing device.

By means of the processing device, in a first step, the hierarchically structured identifiers of the measurement points are each decomposed into hierarchical levels of different significance. In a further step, the identifier of the hierarchical level of the measurement point with the highest significance is selected, and the selected identifiers of the measurement points are transmitted to a preconfigured mass alarm display unit.

In a subsequent step, the selected identifiers, which are transmitted to the preconfigured mass alarm display unit, are each assigned to a correspondingly identified area within an overview image of the plant or process of the preconfigured mass alarm display unit, and in a last step, the alarm reports, which are generated from the measured values, are graphically represented, taking account of the generated assignment of the selected identifiers of the measurement points to the correspondingly identified area within the overview image of the plant or process, so that on the mass alarm display unit, a process-state-driven, dynamically generated, visually sophisticated computer graphic is shown.

Compared with the prior art, in which the process states are made visible via multiple isolated display elements, with the exemplary method according to the disclosure, in an overview image, for instance an overall image of the technical plant or technical process, particular areas can be changed visually, e.g. by colouring or pattern overlaying.

With the exemplary method according to the disclosure, supplementing traditional display systems is also envisaged.

The exemplary system and method according to the disclosure can be used in power stations and oil refineries, and can be suitable for representing process alarms.

BRIEF DESCRIPTION OF THE DRAWINGS

On the basis of the embodiment shown in the figures, the invention and advantageous versions and improvements of the invention will be explained and described in more detail.

DETAILED DESCRIPTION

Figure 1:
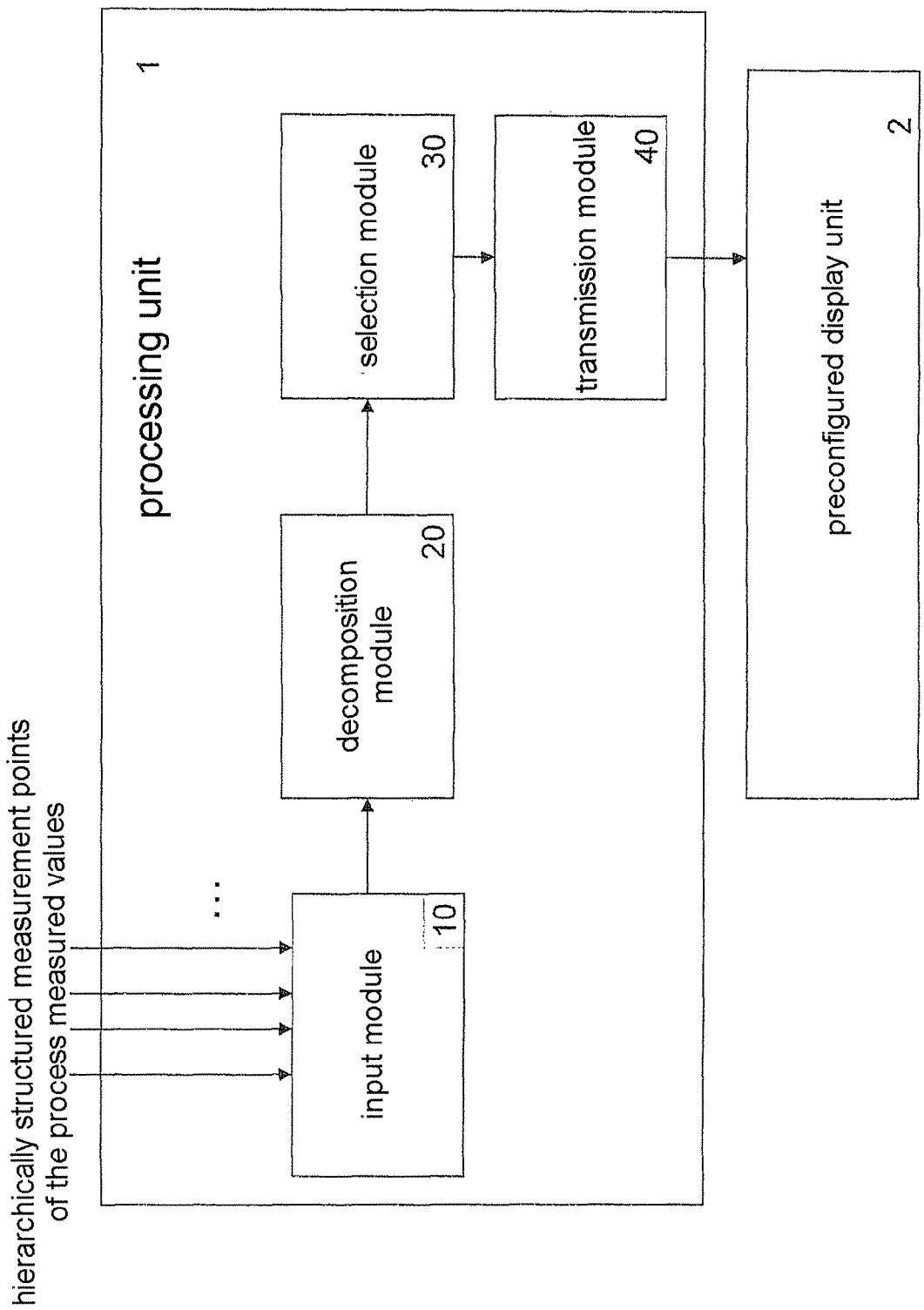
FIG. 1 shows an exemplary embodiment of the display system according to the disclosure for graphic representation of mass alarms from measured values of a power station.

In FIG. 1, an exemplary embodiment of the display system according to the disclosure for graphic representation of alarm reports from measured values of a power station is shown, the measurement points of the measured values each having a hierarchically structured identifier.

According to the disclosure, the exemplary display system for graphic representation of alarm reports from the power station plant includes a processing device 1 and a preconfigured mass alarm display unit 2.

Figure 3:
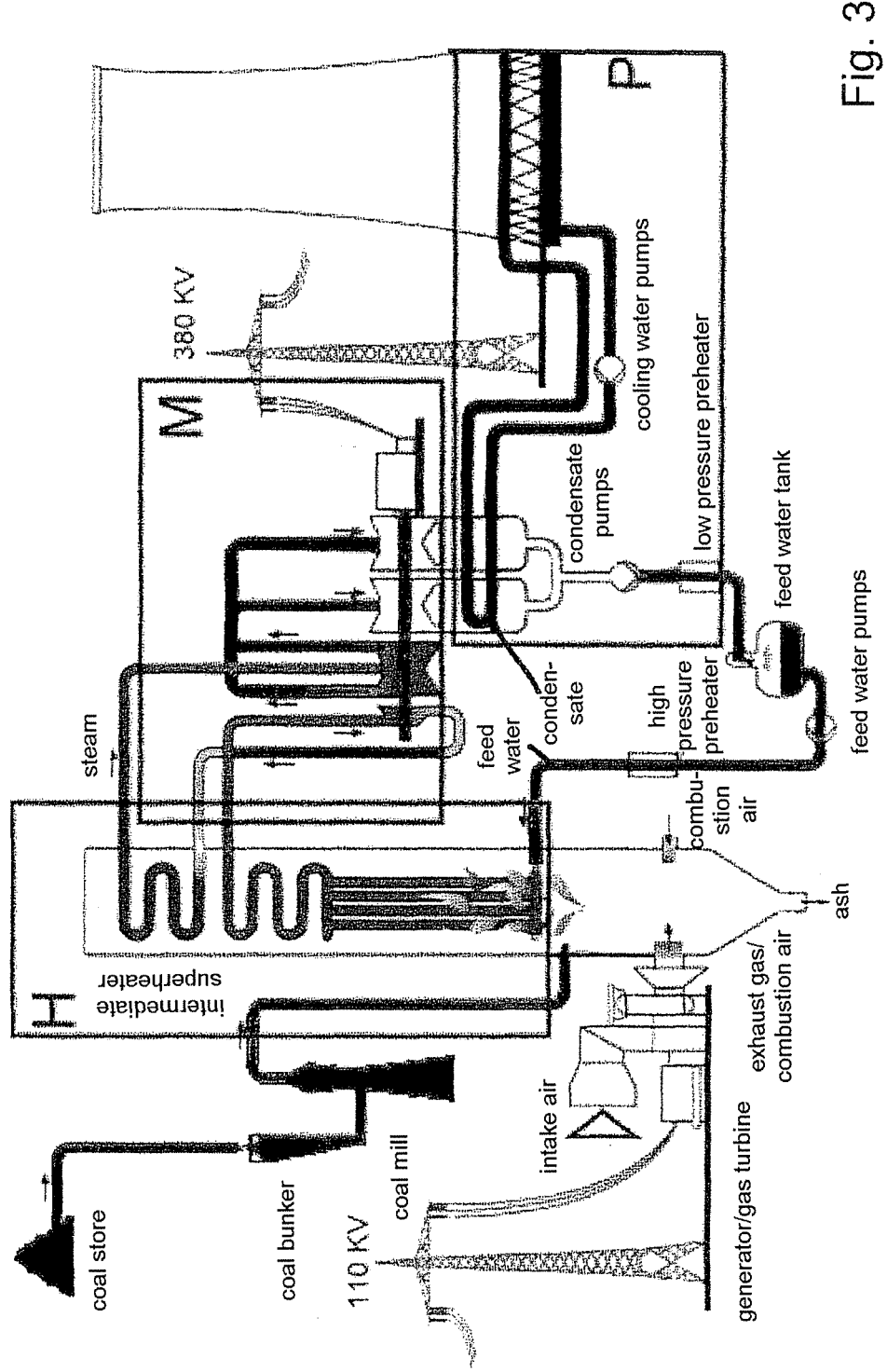
FIG. 3 shows an exemplary plant overview image represented as a bitmap.

The preconfigured mass alarm display unit 2 shows a plant overview image of the power station plant, e.g. the steam circuit. The overview image is divided into individual areas such as the turbine area, the feed water area, the condensate system, the area of the intermediate superheaters and the area of the preheaters. The areas of the overview image are preconfigured so that a unique identifier is assigned to each area, corresponding to the KKS system. FIG. 3 shows an exemplary plant overview image.

The measurement points of the measured values are also each provided with a unique, hierarchically structured identifier according to the KKS system, it being possible to transmit said identifier into an input module 10 of the processing device 1. The input module 10 co-operates with a decomposition module 20, which decomposes the hierarchically structured identifiers of the measurement points into hierarchical levels of different significance, and feeds them to a selection module 30. The selection module 30 selects the identifier of the hierarchical level of the appropriate measurement point with the highest significance, and by means of a transmission module 40, transmits the selected identifiers of the measurement points to the preconfigured mass alarm display unit 2.

The mass alarm display unit 2 assigns the selected identifiers to the corresponding area identifier of the appropriate area within the plant overview image of the preconfigured mass alarm display unit 2. As described above, an identifier of the measurement point with the currently highest significance is based on, for instance, the KKS identifier for the level in the feed water tank.

The alarm reports which are generated from the measured values can now be represented graphically, taking account of the generated assignment of the selected identifiers of the measurement points to the correspondingly identified area within the overview image of the plant or process, and the measured value in the corresponding area of the overview image can be changed visually, e.g. coloured or made fuzzy, if an alarm report occurs for the relevant measured value.

Thus for multiple occurring alarm reports in a specified area of the overview image, a representation form which makes it possible to supplement a traditional display system by means of pictorial mass alarm displays which are generated in this way within the various areas of the plant or process is achieved, so that for the plant driver, the complex process states of the plant can be grasped better.

Figure 2:
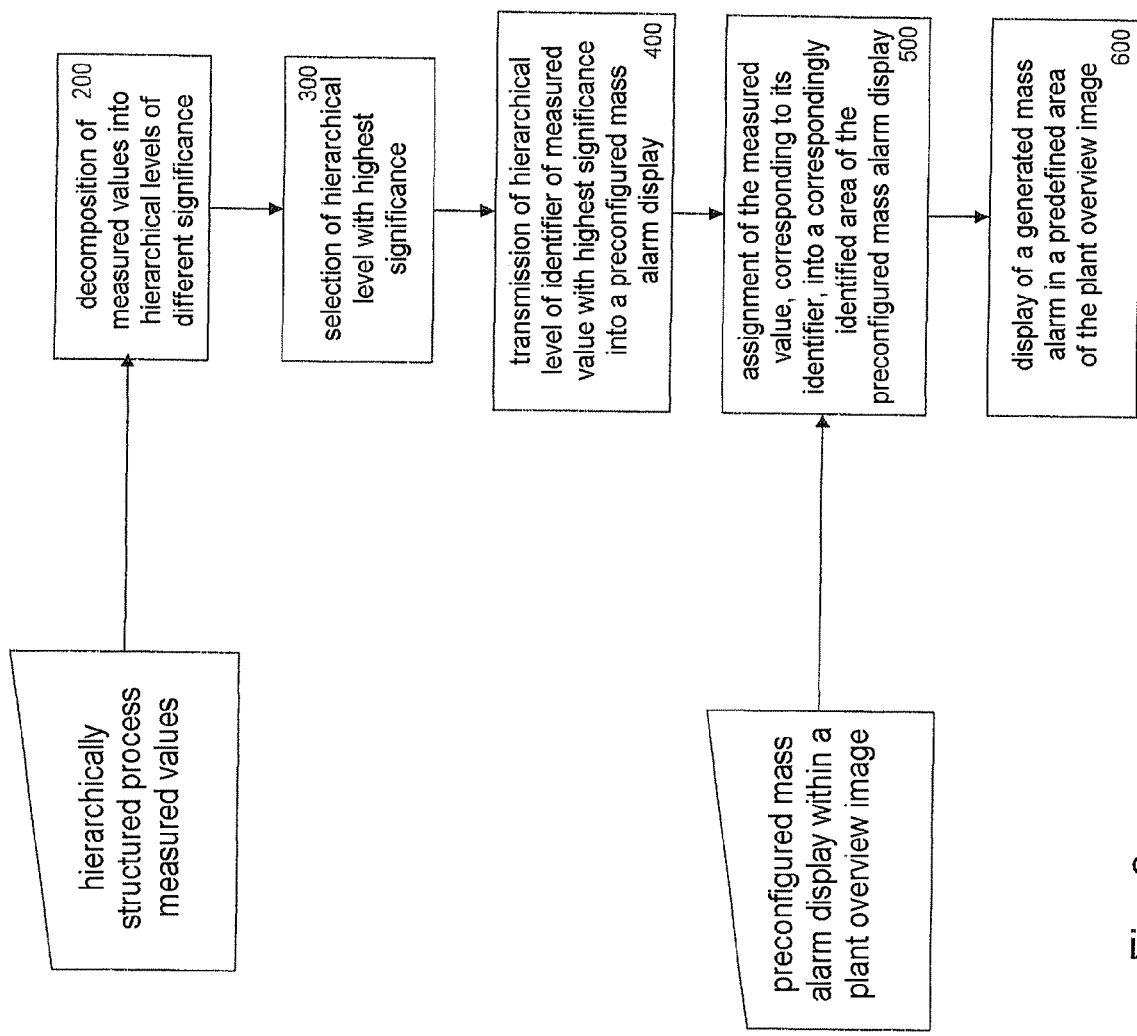
FIG. 2 shows an exemplary process flow for graphic representation of the mass alarms of the power station.

In FIG. 2, an exemplary process flow for graphic representation of the mass alarms of the power station is shown.

The exemplary method according to the disclosure describes a number of steps by which the graphic representation of the alarm reports by means of the alarm display system according to the disclosure is implemented.

In a first step 100, the hierarchically structured identifiers of the measurement points of the plant are transmitted into the processing device 1, and in a second step 200, the hierarchically structured identifiers of the measurement points are decomposed into hierarchical levels with different significance.

After selection of the identifier of the hierarchical level of the relevant measurement point with the highest significance in a third step 300, the selected identifiers of measurement points are transmitted to the preconfigured mass alarm display unit 2 in a fourth step 500.

In a further step 500, the selected identifiers, which have been transmitted to the preconfigured mass alarm display unit 2, are assigned to a correspondingly identified area within an overview image of the plant of the preconfigured mass alarm display unit 2.

In a last step 600, the alarm reports which are generated from the measured values are made visible with an appropriate computer graphic effect, e.g. coloured, taking account of the generated assignment of the selected identifiers of the measurement points to the correspondingly identified area within the overview image, corresponding to their relevance to the functionality of the plant.

A version of the exemplary method according to the disclosure is based on the overall image of the plant being shown on the mass alarm display unit 2 as a bitmap, which is usually a drawing or photograph of the plant, this being shown in FIG. 3 as a plant overview image. The bitmap is divided into multiple areas H, M, P, the areas are treated separately and they can also overlap each other. A specified identifier, e.g. a KKS primary group, is assigned to each of these areas H, M, P, and is valid for numerous plants. The result, advantageously, is the possibility of supplying preconfigured displays which no longer require project-specific adaptation.

For dynamic visualization of the overall image, a computer-supported image processing method, which is based on a configurable graphic transformation, is used. With this graphic transformation, which is known as morphing, a bitmap 1 is cross-faded into another bitmap 2 by computing intermediate transitions between two individual images, bitmap 1 and bitmap 2, and showing these as seamless transitions.

An example of this is standardization of a measured magnitude such as the alarm rate onto an area x=[0 . . . 1]. Bitmap 1 is shown if x=0. Bitmap 2 is shown if x=1. The intermediate stages between bitmap 1 and bitmap 2 are determined according to the following formula: x*bitmap2+(1−x)*bitmap1, where 0<x<1.

In a further exemplary version of the disclosure, the visual effects with which the areas should make process states visible are defined. The visual effects are brought into the corresponding area H, M, P of the bitmap or plant photograph according to a mapping rule to be defined, the mapping rules being, for instance, the number of alarms per time interval in the corresponding primary group, the number of manual interventions per time interval or the priority of the currently occurring alarm with the highest priority.

In this example, a black and white photograph and a colour photograph of the plant exist. For the case that the plant or part of the plant are in a fully functional state, the colour photograph of the plant or part of the plant is shown. As the weighting for the functionality of the plant, for instance the sum of the priorities of the alarms which are active in an area is used. For instance, if the sum of the priorities of the active alarms is 0, the colour photograph is shown, if the sum of the priorities of the active alarms is 100, the black and white photograph is shown, and if the sum of the priorities of the active alarms is between 0 and 100, a correspondingly morphed image from both photographs is shown. The visualization of the plant as described above can also be used to represent a corresponding section of the whole plant.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A display system for graphic representation of alarm reports from measured values of a technical plant or technical process in a power system, the display system comprising:
    a processing device; and
    a mass alarm display unit configured to display an overview image of the technical plant or technical process as a bitmap, wherein:
        the measurement points of the measured values each have a hierarchically structured identifier according to a power station identification system, respectively;
        the overview image is divided into areas, where a unique area identifier is assigned to each area corresponding to the power station identification system;
        the processing device is configured to hold the hierarchically structured identifiers of the measurement points;
        the processing device is configured to decompose the hierarchically structured identifiers of the measurement points into hierarchical levels of different significance, select the identifier of the hierarchical level of the measurement point with the currently highest significance, and transmit the selected identifier to the preconfigured mass alarm display unit; and
        the mass alarm display unit is configured to assign the selected identifier of the relevant measurement point to the corresponding area identifier within the overview image, generate alarm reports from the measured values, and graphically represent the generated alarm reports by applying computer graphic effects to the corresponding identified area within the overview image.

2. The display system according to claim 1, wherein the mass alarm display unit is configured to represent at least one of mass alarms and process alarms.

3. The display system according to claim 1, wherein the mass alarm display unit is preconfigured so that the overview image, which is represented by means of the mass alarm display unit is divided into areas, and a primary key, which defines the visual effects with which the areas of the plant image make the process states which occur visible, is assigned to each of these areas.

4. The display system according to claim 1, wherein the mass alarm display unit is configured to transmit the visual effects, according to a defined mapping rule, into the corresponding areas of the plant image.

5. The display system according to claim 1, wherein mass alarm display unit is configured to display the overview image of the plant or process as a process-state-driven, dynamically generated, visually sophisticated computer graphic.

6. A method of graphic representation of alarm reports from measured values of a technical plant or technical process in a power station, with a processing device, the method comprising:
- assigning a hierarchically structured identifier to each of the measurement points of the measured values of the technical plant or technical process according to a power station identification system, respectively, and holding the hierarchically structured identifiers of the measurement points in the processing device;
- displaying, by means of a preconfigured mass alarm display unit, an overview image of the technical plant or process as a bitmap;
- dividing the overview image into areas, where a unique area identifier is assigned to each area corresponding to the power station identification system;
- by means of the processing device, decomposing the hierarchically structured identifiers of the measurement points into hierarchical levels of different significance, selecting the identifier of the hierarchical level of the measurement point with the highest significance, and transmitting the selected identifier to the preconfigured mass alarm display unit;
- assigning the selected identifier of the relevant measurement point to the corresponding area identifier within the overview image displayed by the preconfigured mass alarm display unit; and
- generating alarm reports from the measured values, and graphically representing the generated alarm reports by applying computer graphic effects to the corresponding identified area within the overview image.

7. The method according to claim 6, wherein at least one of mass alarms and process alarms are represented by means of the mass alarm display unit.

8. The method according to claim 6, wherein the mass alarm display unit is preconfigured so that the plant image which is represented by means of the mass alarm display unit is divided into areas, and a primary key is assigned to each of these areas, the visual effects with which the areas of the plant image make the process states which occur visible being defined taking account of the assigned primary key.

9. The method according to claim 6, wherein the visual effects are transmitted, according to a defined mapping rule, into the corresponding areas of the plant image.

10. The method according to claim 6, wherein the overview image of the plant or process is shown on the mass alarm display unit as a process-state-driven, dynamically generated, visually sophisticated computer graphic.

11. The display system according to claim 2, wherein the mass alarm display unit is preconfigured so that the overview image, which is represented by means of the mass alarm display unit is divided into areas, and a primary key, which defines the visual effects with which the areas of the plant image make the process states which occur visible, is assigned to each of these areas.

12. The display system according to claim 3, wherein the mass alarm display unit is configured to transmit the visual effects, according to a defined mapping rule, into the corresponding areas of the plant image.

13. The display system according to claim 4, wherein the mass alarm display unit is configured to display the overview image of the plant or process as a process-state-driven, dynamically generated, visually sophisticated computer graphic.

14. The method according to claim 7, wherein the mass alarm display unit is preconfigured so that the plant image which is represented by means of the mass alarm display unit is divided into areas, and a primary key is assigned to each of these areas, the visual effects with which the areas of the plant image make the process states which occur visible being defined taking account of the assigned primary key.

15. The method according to claim 8, wherein the visual effects are transmitted, according to a defined mapping rule, into the corresponding areas of the plant image.

16. The method according to claim 9, wherein the overview image of the plant or process is shown on the mass alarm display unit as a process-state-driven, dynamically generated, visually sophisticated computer graphic.

17. A method of graphic representation of alarm reports from measured values in a power station with a processing device, comprising:
- assigning a hierarchically structured identifier to measurement points of the measured values according to a power station identification system, respectively, the hierarchically structured identifiers of the measurement points being held in the processing device,
- displaying, by means of a preconfigured mass alarm display unit, an overview image of a technical plant or process as a bitmap;
- dividing the overview image into areas such that a unique area identifier is assigned to each area corresponding to the power station identification system;
- by means of the processing device, decomposing the hierarchically structured identifiers of the measurement points into hierarchical levels of different significance, and selecting an identifier of the hierarchical level of the measurement point having a high significance, and transmitting the selected identifier to the preconfigured mass alarm display unit,
- assigning the selected identifier of the relevant measurement point to the corresponding area identifier within the overview image displayed by the preconfigured mass alarm display unit, and
- graphically representing alarm reports, which are generated based on the measured values, by applying computer graphic effects to the corresponding identified area within the overview image.

18. The display system according to claim 1, wherein the processing device is configured to decompose the hierarchically structured identifiers of the measurement points into hierarchical levels of different significance based on a weighted priority respectively assigned to the corresponding measurement points.

19. The method according to claim 6, wherein the processing device decomposes the hierarchically structured identifiers of the measurement points into hierarchical levels of different significance based on a weighted priority respectively assigned to the corresponding measurement points.

20. The method according to claim 17, wherein the processing device decomposes the hierarchically structured identifiers of the measurement points into hierarchical levels of different significance based on a weighted priority respectively assigned to the corresponding measurement points.

21. The display system according to claim 1, wherein the computer graphic effects are at least one of (i) coloring a black and white image, (ii) representing the areas by adding one of fuzziness, brightness and darkness to the corresponding areas, (iii) morphing and (iv) pattern overlaying.

22. The display system according to claim 1, wherein the overview image is one of (i) an overall image of the technical plant or technical process, and (ii) a representation of a section of the technical plant.

23. The display system according to claim 1, wherein the bitmap is one of a drawing and a photograph of the technical plant.

24. The method according to claim 6, wherein the computer graphic effects are at least one of (i) coloring a black and white image, (ii) representing the areas by adding one of fuzziness, brightness and darkness to the corresponding areas, (iii) morphing and (iv) pattern overlaying.

25. The display system according to claim 6, wherein the overview image is one of (i) an overall image of the technical plant or technical process, and (ii) a representation of a section of the technical plant.

26. The display system according to claim 6, wherein the bitmap is one of a drawing and a photograph of the technical plant.

27. The method according to claim 17, wherein the computer graphic effects are at least one of (i) coloring a black and white image, (ii) representing the areas by adding one of fuzziness, brightness and darkness to the corresponding areas, (iii) morphing and (iv) pattern overlaying.

28. The display system according to claim 17, wherein the overview image is one of (i) an overall image of the technical plant or technical process, and (ii) a representation of a section of the technical plant.

29. The display system according to claim 17, wherein the bitmap is one of a drawing and a photograph of the technical plant.

\* \* \* \* \*